(12) United States Patent
El Defrawy et al.

(10) Patent No.: US 9,536,114 B1
(45) Date of Patent: Jan. 3, 2017

(54) SECURE MOBILE PROACTIVE MULTIPARTY COMPUTATION PROTOCOL

(71) Applicant: HRL Laboratories, LLC, Malibu, CA (US)

(72) Inventors: Karim El Defrawy, Santa Monica, CA (US); Joshua D. Lampkins, Gardena, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/477,613

(22) Filed: Sep. 4, 2014

Related U.S. Application Data

(63) Continuation-in-part of application No. 14/207,483, filed on Mar. 12, 2014, and a continuation-in-part of application No. 14/449,868, filed on Aug. 1, 2014, which is a continuation-in-part of application No. 14/207,483, filed on Mar. 12, 2014, application No. 14/477,613, which is a continuation-in-part of application No. 14/449,115, filed on Jul. 31, 2014, (Continued)

(51) Int. Cl.
*H04L 29/06* (2006.01)
*G06F 21/75* (2013.01)
*G06F 21/60* (2013.01)

(52) U.S. Cl.
CPC .............. *G06F 21/75* (2013.01); *G06F 21/60* (2013.01); *H04L 63/04* (2013.01)

(58) Field of Classification Search
CPC .... H04L 9/3218; H04L 9/3013; H04L 9/3255; H04L 63/065
USPC ......................................................... 726/26
See application file for complete search history.

(56) References Cited

U.S. PATENT DOCUMENTS 4,633,470 A 12/1986 Welch et al.
4,926,479 A 5/1990 Goldwasser et al.
(Continued)

OTHER PUBLICATIONS

Bai, Li, and XuKai Zou. "A proactive secret sharing scheme in matrix projection method." International Journal of Security and Networks 4.4 (2009): 201-209.*

(Continued)

*Primary Examiner* — Syed Zaidi
(74) *Attorney, Agent, or Firm* — Tope-McKay & Associates

(57) ABSTRACT

Described is system for secure mobile proactive multi-party computation. The system securely evaluates a circuit in the presence of an adversary. The circuit receives secret inputs comprising secret values from a set of servers. Sharings of random values for the random and input gates are generated. For each input gate, a sharing of a random value associated with the input gate is opened toward a server $P_i$. A sum of the server $P_i$'s secret values and the random value is broadcast to the set of servers. Each server uses the sum to adjust its sharing of the random value, generating a sharing of server $P_i$'s secret values. The secret values are re-randomized to preserve privacy of the secret values. A sharing of the secret values is determined for each output gate, and each sharing of secret values is revealed to an intended recipient.

19 Claims, 4 Drawing Sheets

Related U.S. Application Data which is a continuation-in-part of application No. 14/207,321, filed on Mar. 12, 2014.

(60) Provisional application No. 61/780,757, filed on Mar. 13, 2013, provisional application No. 61/861,334, filed on Aug. 1, 2013, provisional application No. 61/861,325, filed on Aug. 1, 2013, provisional application No. 61/780,638, filed on Mar. 13, 2013.

(56) References Cited

U.S. PATENT DOCUMENTS

| 5,625,692 | A  | * | 4/1997  | Herzberg ............... H04L 9/085 380/286 |
|-----------|----|---|---------|----------------------------------------------|
| 6,035,041 | A  |   | 3/2000  | Frankel et al. |
| 7,003,677 | B1 | * | 2/2006  | Herzberg ............ H04L 9/0833 380/286 |
| 7,313,701 | B2 | * | 12/2007 | Frankel ............... G06Q 20/382 705/64 |
| 7,327,847 | B2 |   | 2/2008  | Cachin |
| 8,824,672 | B1 |   | 9/2014  | Gomathisankaran et al. |
| 2004/0139146 | A1 |   | 7/2004  | Cachin |
| 2010/0037055 | A1 | * | 2/2010  | Fazio ................... H04L 9/3218 713/171 |

OTHER PUBLICATIONS

Harn, Lein, and Changlu Lin. "Strong (n, t, n) verifiable secret sharing scheme." Information Sciences 180.16 (2010): 3059-3064.*
Damgård, Ivan, and Jesper Buus Nielsen. "Scalable and unconditionally secure multiparty computation." Advances in Cryptology—CRYPTO 2007. Springer Berlin Heidelberg, 2007. 572-590.*
Joshua Baron and Karin El Defrawy and Joshua Lampkins and Rafail Ostrovsky, "How to Withstand Mobile Virus Attacks. Revisted," Cryptology ePrint Archive, Report 2013/529, 2013, Available at https://eprint.iacr.org/eprint-bin/versions.pl?entry=2013/529.
Alfred V. Aho, John E. Hopcroft, and J. D. Ullman. The Design and Analysis of Computer Algorithms. Addison-Wesley, pp. 299-300, 1974.
Elwyn R. Berlekamp. Algebraic Coding Theory. Aegean Park Press, Chapter 7, 1984.
Michael Ben-Or, Sha Goldwasser, and Avi Wigderson. Completeness theorems for non-cryptographic fault-tolerant distributed computation (extended abstract). In STOC, pp. 1-10, 1988.
Gabriel Bracha. An o(log n) expected rounds randomized byzantine generals protocol. J. ACM, 34(4):910-920, 1987.
Eli Ben-Sasson, Serge Fehr, and Rafail Ostrovsky. Near-linear unconditionally-secure multiparty computation with a dishonest minority. Crytology ePrint Archive, Report 2011/629, 2011.
Zuzana Beerliova-Trubniova and Martin Hirt. Ecient multi-party computation with dispute control. In TCC, pp. 305-328, 2006.
Zuzana Beerliova-Trubniova and Martin Hirt. Perfectly-secure mpc with linear communication complexity. In TCC, pp. 213(230, 2006.
Ivan Damgard, Yuval Ishai, Mikkel Krigaard, Jesper Buus Nielsen, and Adam Smith. Scalable multiparty computation with nearly optimal work and resilience. In CRYPTO, pp. 241-261, 2008.
Ivan Damg ard, Yuval Ishai, and Mikkel Kr igaard. Perfectly secure multiparty computation and the computational overhead of cryptography. In EUROCRYPT, pp. 445-465, 2010.
Ivan Damg ard and Jesper Buus Nielsen. Scalable and unconditionally secure multiparty computation. In CRYPTO, pp. 572-590, 2007.
Michael J. Fischer and Nancy A. Lynch. A lower bound for the time to assure interactive consistency. Inf. Process. Lett., 14(4):183-186, 1982.
Shuhong Gao. A new algorithm for decoding reed-solomon codes. In Communications, Information and Network Security, V.Bhargava, H.V.Poor, V.Tarokh, and S Yoon, pp. 55-68. Kluwer, 2002.

Juan A. Garay and Yoram Moses. Fully polynomial byzantine agreement in t+1 rounds. In STOC, pp. 31-41, 1993.
Amir Herzberg, Stanislaw Jarecki, Hugo Krawczyk, and Moti Yung. Proactive secret sharing or: How to cope with perpetual leakage. In CRYPTO, pp. 339-352, 1995.
Rafail Ostrovsky and Moti Yung. How to withstand mobile virus attacks (extended abstract): In PODC, pp. 51-59, 1991.
David Schultz, Mobile Proactive Secret Sharing. PhD thesis: Massachusetts Institute of Technology. 2007.
Adi Shamir. How to share a secret. Commun. ACM, 22(11):612-613, 1979.
Alfred V. Aho, John E. Hopcroft, and J. D. Ullman. The Design and Analysis of Computer Algoithms. Addison-Wesley, pp. 299-300, 1974.
Vaclav E. Benes. Optimal rearrangeable multistage connecting networks. The Bell System Technical Journal, 43(4):1641-1656, Jul. 1964.
Elwyn R. Berlekamp. Algebraic Coding Theory. Aegean Park Press, 1984, Chapter 7.
Michael Ben-Or, Shafi Goldwasser, and Avi Wigderson. Completeness theorems for non-cryptographic fault-tolerant distributed computation (extended abstract). In STOC, pp. 1-10, 1988.
Eli Ben-Sasson, Serge Fehr, and Rafail Ostrovsky. Near-linear unconditionally-secure multiparty computation with a dishonest minority. Cryptology ePrint Archive, Report 2011/629, 2011.
Zuzana Beerliova-Trubiniova and Martin Hirt. Efficient multi-party computation with dispute control. In TCC, pp. 305-328, 2006.
Zuzana Beerliova-Trubiniova and Martin Hirt. Perfectly-secure mpc with linear communication complexity. In TCC, pp. 213-230, 2008.
Ivan Damgard, Yuval Ishai, Mikkel Kroigaard, Jesper Buus Nielsen, and Adam Smith, Scalable multiparty computation with nearly optimal work and resilience. In CRYPTO, pp. 241-261, 2008.
Ivan Damgard, Yuval Ishai, and Mikkel Kroigaard, Perfectly secure multiparty computation and the computational overhead of cryptography. In EUROCRYPT, pp. 445-465, 2010.
Ivan Damgard, and Jesper Buus Nielsen. Scalable and unconditionally secure multiparty computation. In CRYPTO, pp. 572-590, 2007.
Matthew K. Franklin and Moti Yung. Communication complexity of secure computation (extended abstract). In STOC, pp. 699-710, 1992.
Shuhong Gao. A new algorithm for decoding reed-solomon codes. In Communications, Information and Network Security, Editors V.Bhargava, H.V.Poor, V.Tarokh, and S.Yoon, pp. 55-68. Kluwer, 2002.
Craig Gentry, Shai Halevi, and Nigel P. Smart. Fully homomorphic encryption with polylog overhead. In EURO-CRYPT, pp. 465-482, 2012.
Frank Thomson Leighton. Introduction to parallel algorithms and architectures: arrays, trees, hypercubes. Morgan Kaufmann, 1992, section 3.2.
Rafail Ostrovsky and Moti Yung. How to withstand mobile virus attacks (extended abstract). In PODC, pp. 51-59, 1991.
Abraham Waksman. A permutation network. J. ACM, 15(1):159-163, 1968.
Christian Cachin, Klaus Kursawe, Anna Lysyanskaya, and Reto Strobl. Asynchronous verifiable secret sharing and proactive cryptosystems. In ACM Conference on Computer and Communications Security, pp. 88-97, 2002.
Yvo Desmedt and Sushil Jajodia. Redistributing secret shares to new access structures and its applications. Jul. 1997. Technical Report ISSE TR-97-01, George Mason University.
Oded Goldreich. Foundations of Cryptography: vol. 2, Basic Applications. Cambridge University Press, Chapter 7, 2009.
David Schultz. Mobile Proactive Secret Sharing. PhD thesis, Massachusetts Institute of Technology, 2007.
Theodore M. Wong, Chenxi Wang, and Jeannette M. Wing. Verifiable secret redistribution for archive system. In IEEE Security in Storage Workshop, pp. 94-106, 2002.
Lidong Zhou, Fred B. Schneider, and Robbert van Renesse. Apss: proactive secret sharing in asynchronous systems. ACM Trans Inf. Syst. Secur., 8(3):259-286, 2005.

(56) References Cited

OTHER PUBLICATIONS

Torben P. Pedersen. Non-interactive and information-theoretic secure verifiable secret sharing. In Joan Feigenbaum, editor, CRYPTO, vol. 575 of Lecture Notes in Computer Science, pp. 129-140. Springer, 1991.
Office Action 1 for U.S. Appl. No. 14/449,115. Date mailed: Jul. 23, 2015.
Office Action 1 Response for U.S. Appl. No. 14/449,115. Date mailed. Oct. 23, 2015.
Office Action 2 for U.S. Appl. No. 14/449,115. Date mailed: Nov. 5, 2015.
Office Action 2 Response for U.S. Appl. No. 14/449,115. Date mailed: Feb. 5, 2016.
Office Action 3 for U.S. Appl. No. 14/449,115. Date maiied: Mar. 7, 2016.
Office Action 1 for U.S. Appl. No. 14/207,321, Date maiied: May 18, 2015.
Office Action 1 Response for U.S. Appl. No. 14/207,321. Date mailed: Aug. 18, 2015.
Office Action 2 for U.S. Appl. No. 14/207,321. Date mailed: Dec. 14, 2015.
Office Action 2 Response for U.S. Appl. No. 14/207,321, Date mailed. Apr. 14, 2016.
Office Action for U.S. Appl. No. 14/449,868 Date mailed Aug. 13, 2015.
Bai, Li, and XuKai Zou, "A proactive secret sharing scheme in matrix projection method," International Journal of Security and Networks 4.4 (2009), pp. 201-209.
Harn, Lein, and Changlu Lin, "Strong (n, t, n) verifiable secret sharing scheme," Information Sciences 180.16 (2010), pp. 3059-3064.
Office Action 1 Response for U.S. Appl. No. 14/449,868 Date mailed: Dec. 10, 2015.
Office Action 2 for U.S. Appl. No. 14/449,868. Date mailed: Jan. 29, 2016.
Office Action 1 for U.S. Appl. No. 14/207,483. Date mailed: May 22, 2015.
Office Action 1 Response for U.S. Appl. No. 14/207,483. Date mailed: Sep. 22, 2015.
Office Action 2 for U.S. Appl. No. 14/207,483. Date mailed: Nov. 2, 2015.
Office Action 2 Response for U.S. Appl. No. 14/207,483. Date mailed: Apr. 4, 2016.
Office Action 3 for U.S. Appl. No. 14/207,483. Date mailed: May 2, 2016.
Damgard, Ivan, and Jesper Buus Nielsen. "Scalable and unconditionally secure multiparty computation." Advances in Cryptology—CRYPTO 2007. Springer Berlin Heidelberg, 2007. 572-590.
Office Action 2 Response for U.S. Appl. No. 14/449,868. Date mailed: Apr. 29, 2016.
Notice of Allowance for U.S. Appl. No. 14/449,868. Date mailed: May 25, 2016.
Notice of Allowance for U.S. Appl. No. 14/207,321. Date mailed: May 4, 2016.
Office Action 3 Response for U.S. Appl. No. 14/449,115. Date mailed: Jun. 7, 2016.
Office Action 4 for U.S. Appl. No. 14/449,115. Date mailed: Jun. 24, 2016.

* cited by examiner

SECURE MOBILE PROACTIVE MULTIPARTY COMPUTATION PROTOCOL

CROSS-REFERENCE TO RELATED APPLICATIONS

This is a Continuation-in-Part application of U.S. Non-Provisional Application No. 14/207,483, filed in the United States on Mar. 12, 2014, entitled, "System and Method for Mobile Proactive Secure Multi-Party Computation (MPMPC) Using Commitments," which is a Non-Provisional patent application of U.S. Provisional Application No. 61/780,757, filed in the United States on Mar. 13, 2013, entitled, "An Efficient Protocol for Mobile Proactive Secure Multiparty Computation (MPMPC) Using Commitments."

This is ALSO a Continuation-in-Part application of U.S. Non-Provisional Application No. 14/449,868, filed in the United States on Aug. 1, 2014, entitled. "An Information Secure Proactive Multiparty Computation (PMPC) Protocol with Linear Bandwidth Complexity," which is a Non-Provisional patent application of U.S. Provisional Application No. 61/861,334, filed in the United States on Aug. 1, 2013, entitled, "An information Theoretically Secure Proactive Multiparty Computation (PMPC) Protocol with Linear Bandwidth Complexity."

U.S. Non-Provisional Application No. 14/449,868 is a Continuation-in-Part application of U.S. Non-Provisional Application No. 14/207,483, filed in the United States on Mar. 12, 2014, entitled, "System and Method for Mobile Proactive Secure Multi-Party Computation (MPMPC) Using Commitments," which is a Non-Provisional patent application of U.S. Provisional Application No. 61/780,757, filed in the United States on Mar. 13, 2013, entitled, "An Efficient Protocol for Mobile Proactive Secure Multiparty Computation (MPMPC) Using Commitments." U.S. Non-Provisional Application No. 14/449,868 is ALSO a Non-Provisional patent application of U.S. Provisional Application No. 61/861,325, filed in the United States on Aug. 1, 2013, entitled, "An Information Theoretically Secure Protocol for Mobile Proactive Secret Sharing with Near-Optimal Resilience."

This is ALSO a Continuation-in-Part application of U.S. Non-Provisional Application No. 14/449,115, filed in the United States on Jul. 31, 2014, entitled, "An information Secure Protocol for Mobile Proactive Secret Sharing with Near -Optimal Resilience," which is a Non-Provisional patent application of U.S. Provisional Application No. 61/861,325, filed in the United States on Aug. 1, 2013, entitled, "An Information Theoretically Secure Protocol for Mobile Proactive Secret Sharing with Near-Optimal Resilience." U.S. Non-Provisional Application No. 14/449,115 is ALSO a Continuation-in-Part application of U.S. Non-Provisional Application No. 14/207,321, filed in the United States on Mar. 12, 2014, entitled, "System and Method for Mobile Proactive Secret Sharing," which is a Non-Provisional patent application of U.S. Provisional Application No. 61/780,638, filed in the United States on Mar. 13, 2013, entitled, "An Efficient Protocol for Mobile Proactive Secret Sharing."

FIELD OF INVENTION

The present invention relates to a security system and, more particularly, to a security system that employs a secure mobile proactive multiparty computation protocol.

BACKGROUND OF THE INVENTION

Multiparty computation (MPC) allows a group of servers (sometimes called players or parties) to provide inputs to an arithmetic (or Boolean) circuit and securely evaluate the circuit in the presence of an adversary who may corrupt a fixed portion of the servers. When the adversary corrupts a server, it learns all information stored on that server. The adversary can force corrupt servers to behave arbitrarily, irrespective of the protocol.

Although there are numerous published MPC protocols, none of the published protocols allow a set of servers to change in the middle of a computation, in what would be considered a mobile proactive MPC (MPMPC). The only previous work on a proactive MPC is the work of Rafail Ostrovsky and Moti Yung in "How to withstand mobile virus attacks," In Proceedings of the Tenth Annual ACM Symposium on Principles of Distributed Computing, pages 51-59. ACM Press, 1991 (see the List of Incorporated Cited Literature References, Literature Reference No. 15), which is hereby incorporated by reference as though fully set forth herein. A disadvantage of their protocol is that it is not explicit, in that it does not provide the details of each step to perform and required computations and communication (i.e., the paper only provides a high level argument and description of why it is possible to construct such a protocol). The protocol of Ostrovsky and Yung (see Literature Reference No. 15) is also inefficient. The efficiency is not explicitly stated, but it is at least $\Omega(DCn^3)$ (where D is the circuit depth, C is the number of gates in the circuit and n is the number of servers). Additionally, the Ostrovsky and Yung protocol is non -mobile; the set of servers is fixed and cannot be changed during the computation.

Thus, a continuing need exists for an efficient protocol for mobile proactive security multiparty computation.

SUMMARY OF THE INVENTION

The present invention relates to a security system and, more particularly, to a security system that employs a secure mobile proactive multiparty computation protocol. The system comprises one or more processors and a memory having instructions such that when the instructions are executed, the one or more processors perform multiple operations, The system securely evaluates a circuit in the presence of an adversary, wherein the circuit receives secret inputs comprising secret values from a set of servers. The circuit is divided into a plurality of layers, wherein the circuit comprises input gates, random gates, addition gates, multiplication gates, and output gates. Each layer of the circuit is securely evaluated as follows. A GenPoly protocol is initialized to generate sharings of random values for the random gates and the input gates. For each input gate, a sharing of a random value associated with the input gate is opened toward a server $P_i$ which is to provide input for that input gate. A sum of the server $P_i$'s secret value and the random value is broadcast to the set of servers. Each server in the set of servers uses the sum to adjust it's sharing of the random value, such that its sharing of the random value is now a sharing of server $P_i$'s secret values. A Multiplication-Triple protocol is initialized to generate triples of sharings of secret values. A Secret-Redistribute protocol is initialized to re -randomize the secret values, such that privacy of the secret values is preserved. A sharing of the secret values for each output gate is determined, and a Secret -Open protocol is initialized to reveal each sharing of secret values to an intended recipient.

In another aspect, the number of servers n in the set of servers changes dynamically throughout the evaluation.

In another aspect, the adversary may only corrupt a fixed fraction of servers in the set of servers at a given time based on a corruption threshold.

In another aspect, n can increase or decrease by a factor of two regardless of the corruption threshold.

In another aspect, the system provides perfect security, such that a probability of the adversary compromising the security of the evaluation of the circuit is zero.

In another aspect, it is assumed that a secret s, having a corresponding secret value, has been correctly shared with a polynomial u of degree d, and the system lowers the degree d without revealing the secret value and without requiring a set of virtual servers.

In another aspect, the present invention also comprises a method for causing a processor to perform the operations described herein.

Finally, in yet another aspect, the present invention also comprises a computer program product comprising computer-readable instructions stored on a non -transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
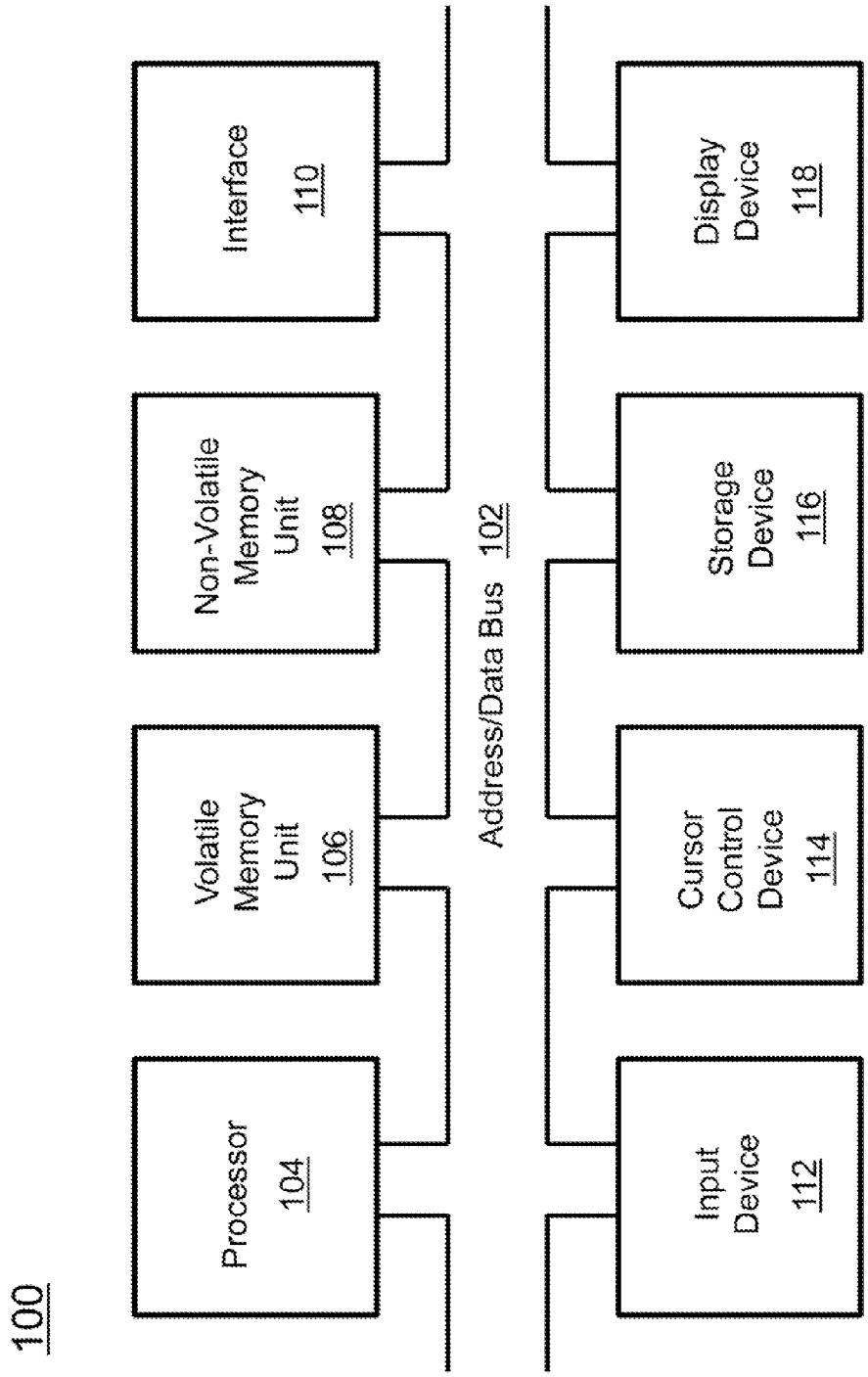
FIG. 1 is a block diagram depicting the components of a system for mobile proactive secret sharing according to the principles of the present invention.

The present invention relates to a security system and, more particularly, to a security system that employs a secure mobile proactive multiparty computation protocol. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Finally, specific details of the present invention are provided to give an understanding of the specific aspects.

(1) List of Incorporated Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Alfred V. Aho, John E. Hopcroft, and J. D. Ullman. The Design and Analysis of Computer Algorithms. Addison-Wesley, pages 299-300, 1974.
2. Elwyn R. Berlekamp. Algebraic Coding Theory. Aegean Park Press, Chapter 7, 1984.
3. Michael Ben-Or, Shafi Goldwasser, and Avi Wigderson. Completeness theorems for non-cryptographic fault-tolerant distributed computation (extended abstract). In STOC, pages 1-10, 1988.
4. Gabriel Bracha. An o(log n) expected rounds randomized byzantine generals protocol. J. ACM, 34(4):910-920, 1987.
5. Eli Ben-Sasson, Serge Fehr, and Rafail Ostrovsky. Near-linear unconditionally-secure multiparty computation with a dishonest minority. Cryptology ePrint Archive, Report 2011/629, 2011.
6. Zuzana Beerliova-Trubiniova and Martin Hirt. Efficient multi-party computation with dispute control. In *TCC*, pages 305-328, 2006.
7. Zuzana Beerliova-Trubiniova and Martin Hirt. Perfectly-secure mpc with linear communication complexity. In *TCC*, pages 213-230, 2008.
8. Ivan Damgard, Yuval ishai, Mikkel Kroigaard, Jesper Butts Nielsen, and Adam Smith. Scalable multiparty computation with nearly optimal work and resilience. In CRYPTO, pages 241-261, 2008.
9. Ivan Damgard, Yuval Ishai, and Mikkel Kroigaard. Perfectly secure multiparty computation and the computational overhead of cryptography. In EUROCRYPT, pages 445-465, 2010.

10. Ivan Damgard and Jesper Buns Nielsen. Scalable and unconditionally secure multiparty computation. In CRYPTO, pages 572-590, 2007.
11. Michael J. Fischer and Nancy A. Lynch. A lower bound for the time to assure interactive consistency. Inf. Process. Lett., 14(4):183-186, 1982.
12. Shuhong Gao. A new algorithm for decoding reed-solomon codes. In Communications, Information and Network Security, Editors V. Bhargava, H. V. Poor, V. Tarokh, and S. Yoon, pages 55-68. Kluwer, 2002.
13. Juan A. Garay and Yoram Moses. Fully polynomial byzantine agreement in t+1 rounds. In STOC, pages 31-41, 1993.
14. Amir Herzberg, Stanislaw Jarecki, Hugo Krawczyk, and Moti Yung. Proactive secret sharing or: How to cope with perpetual leakage. In CRYTPO, pages 339-352, 1995.
15. Rafail Ostrovsky and Moti Yung. How to withstand mobile virus attacks (extended abstract). In PODC pages 51-59, 1991.
16. David Schultz. Mobile proactive secret sharing. PhD thesis, Massachusetts Institute of Technology, 2007.
17. Adi Shamir. How to share a secret. Commun. ACM, 22(11): 612-613, 1979.

(2) Principal Aspects

The present invention has three "principal" aspects. The first is a secure mobile proactive multiparty computation (PMPC) protocol. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track pad, an optical tracking device, or a touch screen. The foregoing, notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
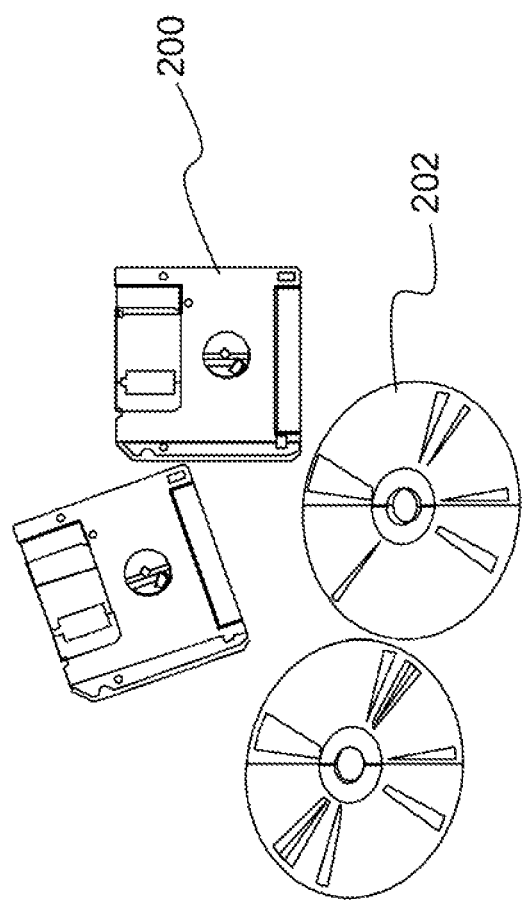
FIG. 2 is an illustration of as computer program product according to the principles of the present invention.

An illustrative diagram of a computer program product (i.e., storage device) embodying an aspect of the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Described is a proactive secure multiparty computation system. Multiparty computation (MPC) allows a set of servers (sometimes called players or parties) to provide inputs to an arithmetic (or Boolean) circuit and securely evaluate the circuit in the presence of an adversary who may corrupt a fixed portion of the servers. When the adversary corrupts a server, it learns all information stored on that server. The adversary can force corrupt servers to behave arbitrarily, irrespective of the protocol. When a circuit is said to be evaluated "securely," it means that the adversary does not learn anything about the inputs of the uncorrupted servers, except what can be deduced from the output of the circuit (which is known to all servers), and that the output of the circuit is correct.

Proactive MPC (or PMPC) is an MPC protocol which still evaluates the circuit securely when the adversary is allowed to corrupt any number of servers, so long as no more than a fixed portion of the servers are corrupt at any given time. Servers are periodically refreshed, and as long as the adversary did not compromise a number of servers larger than the threshold between two consecutive refreshes, the computation is guaranteed to be secure.

Mobile PMPC (or MPMPC) is a PMPC protocol which allows the set of servers performing the computation to change in the middle of the computation. MPMPC provides more flexibility since new servers can be added to the set of servers running the protocol; adding more servers forces the adversary to have to compromise a larger number of servers before it can successfully break the security of the computation. Note that the threshold as a fraction of the total number of servers does not change; what changes is the absolute number of servers that have to be compromised before breaking security.

A set of servers performing the MPMPC protocol are denoted by $\mathcal{P}$. Since the protocol is mobile, $\mathcal{P}$ may change over the course of the execution of the protocol. The secret values of the wires in the circuit (and hence the entire computation) are redistributed (i.e., reset, refreshed) periodically throughout the protocol. The period between adjacent redistributions is called a stage. Also, the period before the first redistribution is a stage, and the period after the last redistribution is a stage.

Let n denote the number of servers and write $\mathcal{P} = \{P_i\}_{i=1}^n$. Let t denote the threshold of corruption (i.e., the maximum number of servers the adversary may corrupt during the current stage). An active adversary that may adaptively corrupt and de-corrupt players at will, so long as the number of corruptions per stage does not exceed the threshold. Any server that is corrupt during a secret redistribution is considered to be corrupt in both adjacent stages. It is required that $t/n < 1/12$ at each stage; however, this condition is relaxed to allow $t/n < 1/3 - \epsilon$ for any fixed $\epsilon > 0$. n is allowed to fluctuate throughout the course of the protocol, but it is assumed that there is some upper bound on n.

Let Corr denote the set of servers that are known by everyone to be corrupt; it is assumed initially that Corr is empty (i.e., Corr=∅). Further, a synchronous network model is assumed, which means that the servers have synchronized clocks so that the communication can be divided into rounds, where in each round a group of messages are sent at roughly the same time with a secure broadcast channel and secure point-to-point communications. Secure erasure is also assumed, meaning that each server can erase its data in such a way that if the adversary later corrupts that server, the adversary cannot feasibly learn any information on what was erased.

The secret sharing scheme used in the system according to the principles of the present invention is based on Shamir's secret sharing scheme (see Literature Reference No. 17 for a description of Shamir's secret sharing scheme), in which the shares of a secret are points on a polynomial, the constant term of the polynomial being the secret. d is used to denote the degree of the polynomial used to distribute the secret. Therefore, knowing any d+1 points on the polynominal allows one to interpolate the secret, but knowing d or fewer points does not reveal any information about the secret. Normally, MPC protocols that use Shamir secret sharing set d=t. However, for the protocol described herein d=3t.

In the context of redistributing shares from one group to another, the labels n, t, d, and u are used for the old group and the labels n', t', d', and u' are used for the corresponding variables/polynomials in the new group. The old group is denoted by $\mathcal{P} = \{P_i\}_{i=1}^n$ and the new group is denoted by $\mathcal{P}' = \{S_j\}_{j=1}^{n'}$. $\alpha_i$ is used to denote the evaluation point of $P_i$ and $\beta_j$ to denote the evaluation point of $S_j$. This is not as notationally clean as just using i and j for the (respective) evaluation points, but the protocol according to the principles of the present invention requires that $\alpha_i \neq \beta_j$ for all i,j so this is necessary. So the share of server $P_i$ (in the old group) is $u(\alpha_i)$ and, similarly, the share of server $S_j$ (in the new group) is $u'(\beta_j)$.

(4) Specific Details of the Invention
(4.1) Protocol Overview

Described below is an overview of the mobile proactive multiparty computation (MPMPC) protocol. Several sub-protocols are used in this description. These protocols are briefly described in the table below.

| Sub-Protocol Name | Description of Achieved Functionality |
|---|---|
| GenPoly | Generates sharings of random polynomials |
| Secret-Redistribute | Redistributes a shared secret so that the new shares are completely random relative to the old ones. |
| Secret-Open | Opens a secret that has been shared among the servers so that now they all know its value. |
| Multiplication-Triple | Generates triples of sharing of secret values such that one of the secrets is the product of the other two. |
| Pre-Process | Assigns sharings to random gates, allows servers to share their inputs, and assigns sharings of multiplication triples to multiplication gates. |
| Committee-BW | After the protocol is altered using server virtualization, this protocol allows a committee to perform the Berlekamp-Welch algorithm in a constant number of rounds. |

Figure 3:
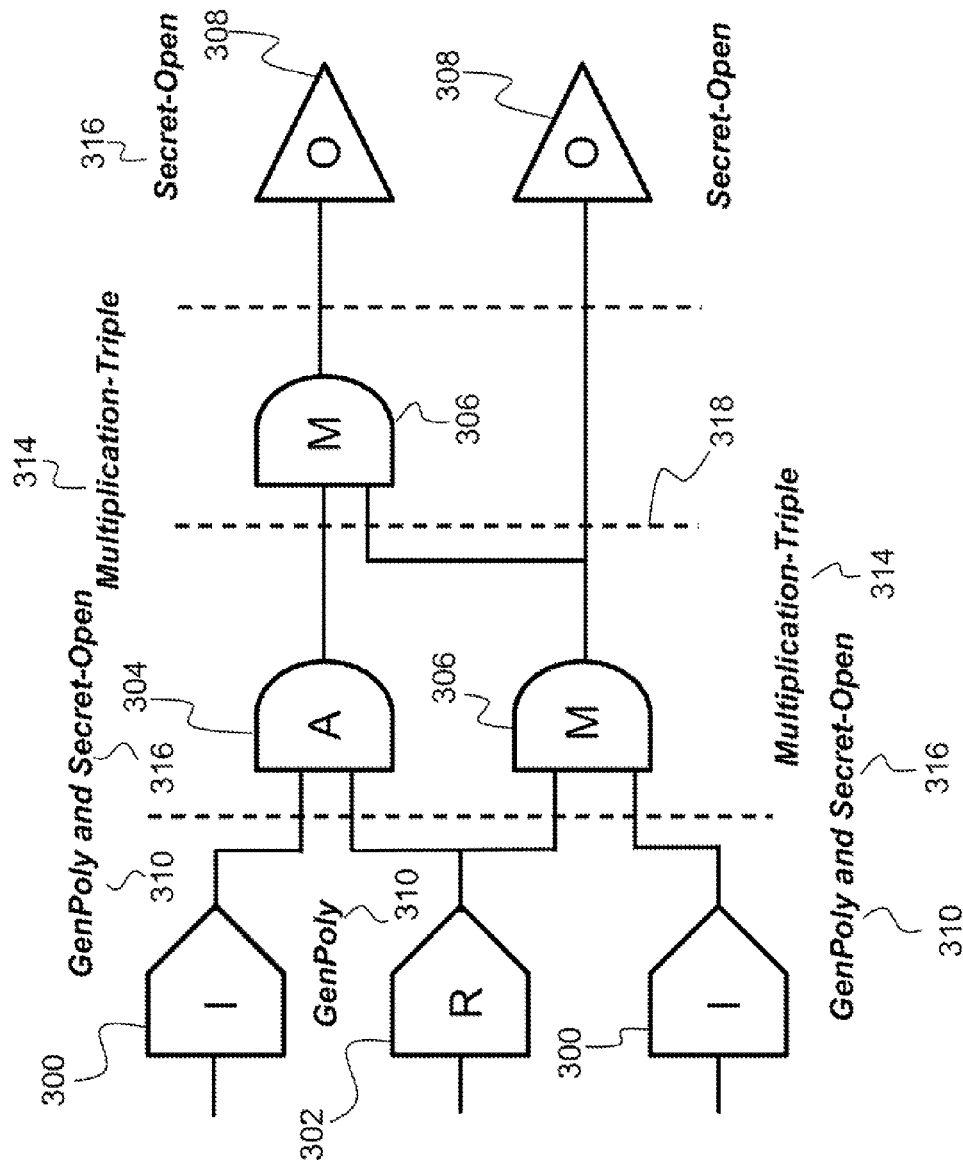
FIG. 3 illustrates an example of an arithmetic circuit.

The MPMPC protocol proceeds as follows. First, sharings of random values for random gates and input gates are generated using a GenPoly protocol (FIG. 3, element 310). Then, the random sharing associated with each input gate (FIG. 3, element 300) is opened (with the Secret-Open protocol 316) toward the server who is to provide the input for that gate. That server then broadcasts the sum of its secret and the random value, and all of the servers use this value to adjust their sharing of the random value so that it is now a sharing of the secret input. A Multiplication-Triple protocol (FIG. 3, element 314) with random sharings (created using the GenPoly protocol (FIG. 3, element 310)) is invoked to generate sharings of multiplication triples (i.e., sharings of three values a, b, and c such that c=ab).

After the initial setup has been done, the servers compute the circuit layer-by-layer. The circuit may be any method partitionable into layers wherein each layer may comprise computations and logic tests. FIG. 3 illustrates an example circuit divided into layers depicting input (I) gates 300, random (R) gates 302, an affine (A) gate 304, multiplication (M) gates 306, and output (O) gates 308. The protocols used in helping evaluate each gate are labeled next to the gates, including the GenPoly protocol 310, the Multiplication-Triple protocol 314, and the Secret-Open protocol 316. Affine gates 304 can be evaluated via local computations without running an explicit protocol. The circuit is divided into layers via dashed lines 318. Multiplication gates 306 can be evaluated using the prepared Multiplication-Triple protocol 314 and invoking the Secret-Open protocol 316. After each layer of the circuit is evaluated, the servers run a Secret-Redistribute protocol (not shown) to re-randomize the secrets, thereby preserving privacy of the stored values. Once a sharing for an output gate 308 has been computed, the servers invoke the Secret-Open protocol 316 to reveal it. Once all of the outputs have been revealed, the protocol is complete.

Figure 4:
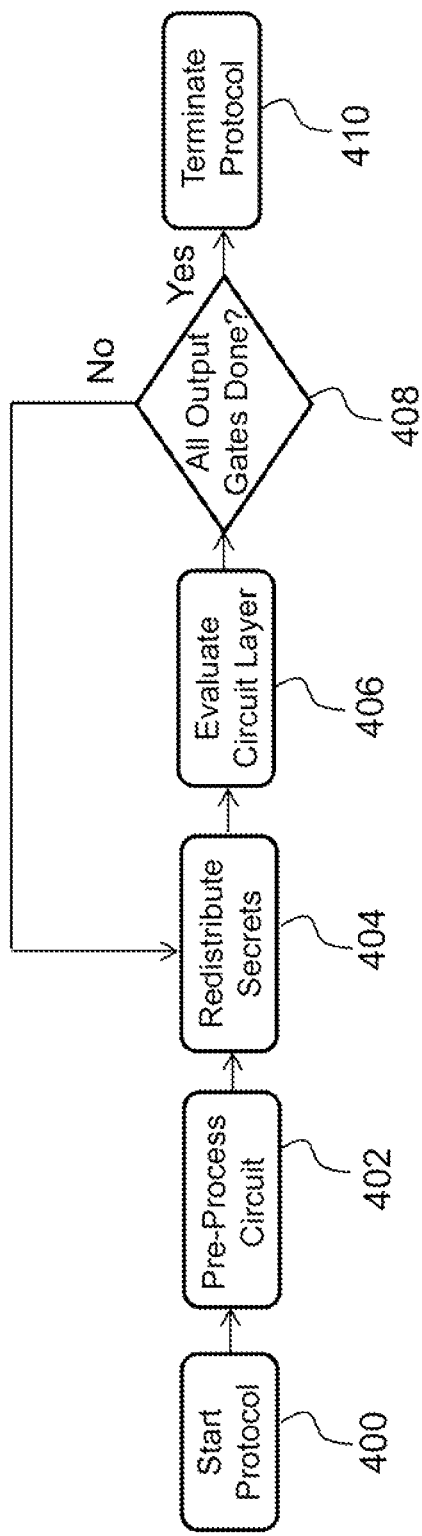
FIG. 4 is flowchart depicting a system for mobile proactive multiparty computation (MPMPC) according to the principles of the present invention.

FIG. 4 illustrates a flow chart for the protocol according to the principles of the present invention. In a first step 400, the protocol starts. In a second step 402, the circuit is pre-processed. Next, in a third step 404 of the process, secrets are redistributed. In a fourth step 406, the circuit layer is evaluated. In a fifth step 408, the system determines if all output gates have been computed. If not, the process returns to the third step 404 to re-randomize all the stored secrets. If all output gates are done, then the protocol is terminated in a sixth step 410. Each of the steps will be described in further detail below.

(4.2) Circuit Evaluation

A gate is said to be "evaluated" if a sharing of its output has been distributed. A gate is called "ready" if all its input gates have already been evaluated. The circuit is evaluated in stages, and at each stage all "ready" gates are evaluated. Note that affine gates can be computed locally without any communication, so that the number of stages needed to evaluate the circuit is solely dependent on the multiplicative depth of the circuit. The multiplicative depth of the circuit is called $\mathcal{D}$. .

A sharing of a secret s is denoted by [s]. Note that the servers can perform affine operations on secrets locally by performing the corresponding operations on their shares. For instance, suppose secrets $s^{(1)}, \ldots, s^{\Lambda}$ have been shared, and the servers want to compute a sharing of $r = \alpha^{(0)} + \Sigma_{j=1}^{\Lambda} \alpha^{(j)} s_i^{(j)}$ for some publicly known constants $\alpha^{(0)}, \ldots, \alpha^{(\Lambda)}$. Writing server's $P_i$ share of $s^j$ as $s_i^{(j)}$, $P_i$ can compute its share of $r_i$ of r as $r_i = \alpha^{(0)} + \Sigma_{j=1}^{\Lambda} \alpha^{(j)} s_i^{(j)}$. If all of the servers perform this operation locally, the operation is written as $[r] = \alpha^{(0)} + \Sigma_{j=1}^{\Lambda} \alpha^{(j)} [s_i^{(j)}]$.

Described below is the main protocol, MPMPC. The protocol MPMPC uses several subprotocols, which are outlined in detail below. For the invocation of the Secret-Redistribute protocol, it is assumed that some trusted third party, such as a network administrator, determines who the new group of shareholders will be.

(4.2.1) MPMPC (t, $\mathcal{P}$, Circ)

Set Corr≠∅. First, invoke Pre-Process (t, $\mathcal{P}$, Corr, Circ). Repeat the following steps until all output gates have been evaluated.

1. Invoke the Secret-Redistribute protocol (represented by element 404) for each stored secret. Update $\mathcal{P}$ accordingly.
2. Evaluate each "ready" multiplication/output gate as follows.
    2.1 For each multiplication gate in parallel, do the following:
        2.1.1 Denote the multiplication triple associated with the multiplication gate by ([a], [b], [c])(i.e., c=ab) and denote the inputs by [x] and [y]. Locally compute $[\alpha] = [x] + [\alpha]$ and $[\beta] = [y] + [b]$.
        2.1.2 Invoke the Secret-Open (t, $\mathcal{P}$, [α]) protocol (element 316) and the Secret-Open (t, $\mathcal{P}$, [β]) protocol (element 316) in parallel.
        2.1.3 Locally compute the output of the multiplication gate (element 306) as $\alpha\beta - \alpha[b] - \beta[\alpha] + [c]$.
    2.2 For each output gate (element 308), invoke the Secret-Open protocol (element 316) in parallel. This is done in parallel with step 2.1.2.
3. For each "ready" affine gate, each server performs the affine operations on its shares locally.

The communication complexity of MPMPC is $O(\mathcal{D} \mathcal{P} n^2)$.

(4.3) Secret Sharing, Redistribution, and Opening
(4.3.1) Generating Random Polynomials A matrix is said to be hyper-invertible if any square submatrix formed by removing rows and columns is invertible. It is shown in Literature Reference No. 7 how to construct hyper-invertible matrices. Let M be a hyper-invertible matrix with n rows and n−2t columns. It was shown in Literature Reference No. 10 that if x is an n-dimensional vector and n−2t of its coordinates have a uniformly random distribution and the other 2t coordinates have an arbitrary distribution independent of the n−2t coordinates, then all of the coordinates of $M^\tau x$ have a uniformly random distribution. It is assumed there is a publicly known M, fixed for each stage of the protocol.

Described below is a protocol for creating $\Lambda$ random polynomials in parallel. This protocol generates polynomials of degree D, where one may have D≠d. These polynomials can either be used as sharings of random values or as masking polynomials for secret redistribution (see the Secret-Redistribute protocol (represented by element 404)). The polynomials are generated in batches of size (n−2t)(n−3t), so if $\Lambda$ is not a multiple of (n−2t)(n−3t), some additional polynomials will be generated.

(4.3.1.1) GenPoly(t, $\mathcal{P}$, Corr, $\Lambda$, D) (element 310)

$\Lambda$' is defined as $\lceil\Lambda/(n-2t)\rceil$. B is defined as $\lceil\Lambda'/(n-3t)\rceil$. Each server will generate B batches of n−3t random sharings. The following steps are implemented in parallel for each batch.
1. Proposal Distribution
   1.1 Each server $P_i \notin$ Corr generates n−2t random polynomials $\{Q_i^{(k)}\}_{k=1}^{n-2t}$ of degree D.
   1.2 Each $P_i \notin$ Corr sends $Q_i^{(k)}(\alpha_j)$ for each k=1, . . . , n−2t to each $P_j \notin$ Corr.
   1.3 For each $P_i \notin$ Corr, each server locally computes their shares of the polynomials defined by $(Y_i^{(1)}, Y_i^{(2)}, \ldots, Y_i^{(n)})^T = M(Q_i^{(1)}, Q_i^{(2)}, \ldots, Q_i^{(n-2t)})^T$.
   1.4 Each $P_i \notin$ Corr sends its share of $Y_j^{(k)}$ received from each $P_j \notin$ Corr to server $P_k$.
   1.5 Each $P_i \notin$ Corr sends all shares of $Y_i^{(k)}$ to server $P_k$.
2. Error Detection
   2.1 If $P_i \notin$ Corr notes that the sharing of $Y_j^{(i)}$ sent to him by $P_j$ is inconsistent, he broadcasts ($P_i$, accuse, $P_j$), and both $P_i$ and $P_j$ are added to Corr.
   2.2 If $P_i \notin$ Corr notes that the share $Y_j^{(i)}(\alpha_m)$ set by $P_m$ is different than the same share sent by $P_j$, then $P_i$ broadcasts ($P_i$, inconsistent, $P_m$, $P_j$, $v_m$, $v_j$, b), where b is the batch number, $v_m$ is the share sent by $P_m$, and $v_j$ is the share sent by $P_j$.
   2.3 If $P_m$ disagrees with the $v_m$ broadcast in step 2.2, then $P_m$ broadcasts ($P_m$, accuse, $P_i$), and both $P_m$ and $P_i$ are added to Corr.
   2.4 If $P_j$ disagrees with the $v_j$ broadcast in step 2.2, then $P_j$ broadcasts ($P_j$, accuse, $P_i$), and both $P_j$ and $P_i$ are added to Corr.
   2.5 If neither $P_m$ nor $P_j$ broadcast a disagreement with the values broadcast in step 2.2, then they agree that they sent different values to $P_i$, so both $P_m$ and $P_j$ are added to Corr.
3. Final Computation For each $P_i \in$ Corr and each k, $Q_i^{(k)}$ is defined to be the all-zero polynomial. Each group k for k=1, . . . , n−3t of n polynomials is converted into a group of n−2t polynomials as follows:

$$(R^{((k-1)(n-2t)+1)}, R^{((k-1)(n-2t)+2)}, \ldots, R^{(k(n-2t))})^T = M^T(Q_1^{(k)}, Q_2^{(k)}, \ldots, Q_n^{(k)})^T.$$

The output is the set of polynomials $\{R^{(s)}\}$ output from each batch.

The protocol GenPoly has a communication complexity of $O(\Lambda'n^2) = O(\Lambda n + n^2)$ field elements (assuming that D=O(n)). Note that multiple instances of the GenPoly protocol can be invoked in parallel, even if the degree of the generated polynomials are different.

(4.3.2) Secret Redistribution (element 404)

The following protocol allows one to redistribute the shared secrets to a new set of servers to perform the computation in the next stage. It is described in such a way that the set of old servers ($\mathcal{P}$) and the set of new servers ($\mathcal{P}'$) are disjoint. However, it can easily be adapted to allow some (or all) of the servers in the new group to be in the old group. This is done as follows: Each server $P_i$ from the old group who is to be included in the new group is given a new identity $S_j$. In essence, there is one real server in control of two virtual servers $P_i$ and $S_j$. Once the share redistribution is complete, the real server erases all data associated with the virtual server $P_i$ and keeps all data associated with $S_j$.

It is required that $\alpha_i \neq \beta_j$ for all (i,j)(unless $P_i$ and $S_j$ correspond to the same real server). Otherwise, an adversary in control of $P_i$ would know $u(\beta_j)$ and $Q(\beta_j)$, allowing him to determine $u'(\beta_j)$, which is $S_j$'s share of the secret. This would give the adversary an extra evaluation point on u', and might leak the secret.

In this protocol (Secret-Redistribute protocol (element 404)) and several that follow, the Berlekamp-Welch algorithm is used. The algorithm can be found in many coding theory texts (for instance, see Literature Reference No. 2 for a description of the Berlekamp-Welch algorithm). To briefly overview this algorithm, suppose that one is trying to interpolate a polynomial $Q$. The supposed (but possibly incorrect) values of $Q$ are given by $y_i$, which supposedly equals $Q(\alpha_i)$ for i=1, . . . ,n. Since there are at most t errors, E is defined to be the polynomial of degree no more than t whose roots are the locations $\alpha_i$, where $y_i \neq Q(\alpha_i)$(i.e., the adversary corrupted $y_i$). Then, define a polynomial $N=Q$ E whose degree is t plus the degree of $Q$. By the way E and N are defined, the equation $N(\alpha_i) = y_i E(\alpha_i)$ holds for all i=1, . . . ,n (even if the adversary corrupted $y_i$). Then the system of equations $N(\alpha_i) = y_i E(\alpha_i)$ is solved for the coefficients of N and E. The correct value of $Q$ is then determined by setting $Q = N/E$.

(4.3.2.1) Secret-Redistribute (t, $\mathcal{P}$, Corr, t', $\mathcal{P}'$, [s])

It is assumed the secret s has been correctly shared with polynomial u of degree d.
1. Polynomial Generation
   Invoke the GenPoly (t, $\mathcal{P}$, Corr , n'+1, d'−1) protocol to generate $Q$ and $\{R^{(j)}\}_{j=1}^{n'}$ of degree d'−1. If the threshold is decreasing (i.e., t'<t and d'<d), also invoke the GenPoly (t, $\mathcal{P}$, Corr, 1, d') protocol in parallel with the above invocation to generate W of degree d'. (The $k^{th}$ coefficient of $Q$ is $q_k$, and similarly for $R^{(j)}$ and W.)
2. Lowering the Degree
   If the threshold is decreasing, the following steps are performed.
   2.1 Each $P_i \notin$ Corr broadcasts $u(\alpha_i) + W(\alpha_i)$.
   2.2 Each server interpolates u+W using the Berlekamp-Welch algorithm.
   2.3 Let H denote the highest-order d−d' terms of u+W (i.e., u+W is a degree d polynomial, but u+W−H is a degree d' polynomial). The polynomial u is now replaced with u−H, which lowers the degree of u without changing the secret. Players internally update their shares.
3. Share Transfer and Interpolation
   3.1 Each $P_i$ sends $u(\alpha_i) + \alpha_i Q(\alpha_i) + (\alpha_i - \beta_j) R^{(j)}(\alpha_i)$ to each $S_j \in \mathcal{P}'$. (The idea is that for $S_j$, the servers in the old group mask u with the polynomial $xQ(x) + (x-\beta_j)R^{(j)}(x)$.)
   3.2 Each $S_j$ uses Berlekamp-Welch to interpolate (x)Q (x)+(x−$\beta_j$)$R^{(j)}$(x) from the shares sent in step 3.1.

3.3 The new sharing polynomial is defined to be $u'(x)=u(x)+xQ(x)$. Since $(x-\beta_j)R^{(j)}(x)$ evaluates to zero at $=\beta_j$, $S_j$ can deduce $u'(\beta_j)$ from the points on $u'(x)+(x-\beta_j)R^{(j)}(x)$ sent to it by the servers in the old group. So each $S_j$ uses the polynomial interpolated in step 3.2 to interpolate its new share $u'(\beta_j)$.

4. Data Erasure

Each $P_i$ in the old group erases all their data.

The communication complexity of the Secret-Redistribute protocol is $O(n^2)$ field elements. The threshold may change by at most a factor of 2 at each redistribution (i.e., $t/2 \le t' \le 2t$).

(4.3.3) Secret Opening (element 316)

(4.3.3.1) Secret-Open (t, $\mathcal{P}$, [s])

It is assumed the secret s has been shared with polynomial u of degree d.

1. Each server $P_i$ broadcasts its share $u(\alpha_i)$.
2. Each server uses the Berlekamp-Welch algorithm to interpolate the secret $s=u(0)$.

The communication complexity of the Secret-Open protocol (element 316) is $O(n)$ field elements. Multiple instances of the Secret-Open protocol (element 316) can be invoked in parallel.

(4.4) Circuit Preparation (4.4.1) Generating Multiplication Triples (element 314)

Multiplication triples of shared secrets need to be generated in a verifiable manner. The protocol for generating multiplication triples in Literature Reference No. 10 uses a degree d sharing of a random number r, together with a degree 2d sharing of the same value. Redistributing a 2d sharing would be problematic for the protocol, so instead three random sharings, [r], [$s^{(1)}$], and [$s^{(2)}$], are used, and when a degree 2d sharing of r is wanted, the servers locally compute $[r]+x[s^{(1)}]+x^d[s^{(2)}]$. The reason this linear combination is used is so that one gets a degree 2d sharing of r such that all the coefficients of the polynomial used to share r are random relative to the coefficients of the original sharing, [r], except for the fact that the constant term for both sharings is r.

The following protocol uses the sharings [a], [b], [r], [$s^{(1)}$], and [$s^{(2)}$] to generate a (correct) sharing [c] such that c=ab.

(4.4.1.1) Multiplication-Triple (t, $\mathcal{P}$, Corr, [a], [b], [r], [$s^{(1)}$], and [$s^{(2)}$]) to 1. Each server broadcasts their share of $[a][b]+[r]+x[s^{(1)}]+x^d[s^{(2)}]$.
2. Each server uses the Berlekamp-Welch algorithm to interpolate ab+r.
3. Each server locally defines [c]=(ab+r)−[r].

The communication complexity of the Multiplication-Triple protocol is $O(n)$.

(4.4.2) Pre-Processing of the Circuit Representing the Computation

Let $C_I$, $C_R$, $C_M$, $C_O$ denote the number of input, random, multiplication, and output gates in the circuit (respectively), and define $\mathcal{C}=C_I+C_R+C_M+C_O$.

Note that affine gates are not included in this sum. An example arithmetic circuit showing each type of gate is depicted in FIG. 3. Note that although the GenPoly protocol (element 310) described above was used to generate masking polynomials for redistributing secrets, it can also be used to generate sharings of random secrets. To do this, one simply takes the constant term of the polynomial to be the secret.

The protocol for preprocessing different gates in the circuit is denoted as a Pre-Process (t, $\mathcal{P}$, Corr, Circ) protocol and is outlined below.

(4:4.2.1) Pre-Process (t, $\mathcal{P}$, Corr, Circ) (represented by element 402)

1. Invoke the GenPoly (t, $\mathcal{P}$, Corr, ($C_I+C_R+5C_M$), d) protocol (element 310) to generate $C_I+C_R+5C_M$ random sharings. Associate one random sharing to each input gate, one to each random gate, and five to each multiplication gate.
2. Invoke the Secret-Redistribute protocol (element 404) for each stored secret. Update $\mathcal{P}$ accordingly.
3. For each input gate for server $P_i$ with input s and associated random value [r], the following steps are performed in parallel.
   3.1 Each server sends its share of [r] to $P_i$.
   3.2 $P_i$ uses the Berlekamp-Welch algorithm to interpolate r and broadcasts r+s.
   3.3 Each server locally computes (r+s)−[r] as the sharing for the input gate.
4. Using the values generated in step 1, and in parallel with step 3, invoke $C_M$ instances of the Multiplication-Triple protocol (element 314) in parallel so that one multiplication triple is associated with each multiplication gate.

The communication complexity of the Pre-Process protocol is $O(\mathcal{C} n^2)$ (element 402). For the invocation of the Secret-Redistribute protocol (element 404), it is assumed that some trusted third party (such as a network administrator) determines who the new group of shareholders will be. This is invoked in the middle of the protocol in order to minimize the number of intervening rounds between redistributions.

(4.5) Player Virtualization in a Constant Number of Rounds

The MPMPC protocol according to the principles of the present invention has a very low threshold of corruption, $t<n/12$. In order to increase it, server virtualization is used (see Literature Reference No. 4 for a description of server virtualization). The servers in the above protocol are replaced with committees of servers so that a smaller fraction of committees are corrupt than the fraction of servers that are corrupt.

The result of Literature Reference No. 4 is non-constructive in that the committees are chosen randomly; it is shown that with high probability the random choices will lead to a good selection of committees. The technique of Literature Reference No. 4 was made constructive in Literature Reference No. 8.

Lemma 9.1 (from Literature Reference No. 8)

Assume there are n servers. For any $0<\epsilon, \delta<1$, there exists a construction of n committees of size s32 $O(1/\delta\epsilon^2)$ such that if no more than $$\left(\frac{1}{2}-\epsilon\right)$$

n of the servers are corrupt, then no more than $\delta \cdot s$ committees will be corrupt (where a committee is corrupt if s/2 or more of its members are corrupt). The members of the committees can be computed in time $n \cdot \text{polylog } n$.

For the protocol described herein, committees of size s will be used such that if c is the number of corrupt servers in a committee, then $c<s/3$ means that the committee is "good". The BGW protocol (see Literature Reference No. 3 for a description of the BGW protocol) is used for the inner protocol, as this protocol has a constant number of communication rounds (per multiplication). So after player virtualization, the protocol according to the principles of the present invention has a threshold of $t/n<1/3-\epsilon$ for some $\epsilon>0$ chosen by the end user.

There is an issue with the MPMPC protocol if server virtualization is to be used. When virtualization is invoked and each server is replaced by a committee, some internal computations must be simulated by multiparty computation among the committee. If one examines all the subprotocols being used, then it is clear that there are only a few types of computations that need to be performed throughout the entire protocol: addition, multiplication of two secret values, multiplication of a vector of shares by a publicly known hyper-invertible matrix, and application of the Berlekamp-Welch algorithm. Each of these four operations is discussed individually below.

Additions are performed simply by adding shares as specified in the BGW protocol.

Multiplication of two secret values only occurs when the committee needs to multiply two of its shares; this only occurs in the Muitipiication-Triple protocol (element 314). These multiplications will be handled as specified in the BGW protocol. Since the committee size is constant, this only requires a constant amount of computation per multiplication. Examining the BGW protocol, each multiplication requires seven communication rounds and six broadcast rounds.

In order to reduce the number of broadcasts used in the main protocol, all the broadcasts in the BGW multiplication subprotocol will be implemented with point-to-point channels using a broadcast protocol. The minimum number of rounds to implement a (deterministic) broadcast protocol for a committee with at most c corrupt servers is $c+1$. Since c is a constant that depends on $\epsilon$, the protocol described herein will work in a constant number of rounds. Any broadcast protocol that achieves the $c+1$ lower bound on the number of rounds and has communication and computational complexity polynomial in the number of committee members will work. For instance, the protocol of Literature Reference No. 13 may be used as a broadcast protocol. This results in a total of $7+6(c+1)=13+6c$ rounds of communication per multiplication.

Multiplication of a vector of shares by a publicly known hyper-invertible matrix can be done efficiently in committees. Each committee member simply performs the required operations on their shares. Every hyper-invertible matrix in the MPMPC protocol has dimension $\Theta(n)$ by $\Theta(n)$. Normally, such a computation would require $\Theta(n^2)$ multiplications. However, since the hyper-invertible matrices model polynomial interpolation and evaluation, efficient algorithms from the computer science literature (for instance, see Literature Reference No. 1) can be used to do these computations with only $O(n\text{polylog} n)$ multiplications.

Application of Berlekamp-Welch algorithm in committees requires some care, because a straightforward application of the BGW protocol would lead to non-constant round complexity. The Berlekamp-Welch algorithm can be performed in $O(n\text{polylog}(n))$ time. This adds a polylog(n) factor to the communication complexity, which is not problematic. However, it requires $O(\text{polylog}(n))$ rounds of communication, and the MPMPC protocol is required to work in a constant number of rounds.

An alteration of the Berlekamp-Welch algorithm for committees will be constructed that has constant round complexity. This requires generating extra masking randomness. In fact, for each polynomial to interpolate, an additional c polynomials must be generated. However, the committee size is fixed throughout the protocol (as it depends on $\epsilon$ and $\delta$). Therefore, generating these extra sharings does not affect the asymptotic complexity of the protocol.

When the MPMPC protocol is virtualized, invocations of the GenPoly protocol (element 310) will be inserted just before each execution of Berlekamp-Welch to generate masking polynomials, followed by each committee sending its share of each masking polynomial to the correct committee. Then each execution of Berlekamp-Welch is replaced with an execution of the Committee-BW protocol described below. The number of polynomials generated and the degrees of the polynomials will be different in different steps. For every polynomial the servers want to interpolate, they generate c masking polynomials of the same degree. Again, this does not add to the overall communication complexity of the protocol since c is constant once $\delta$ and $\epsilon$ are decided. Also, by examination of the MPMPC protocol, it is clear that the Berlekamp-Welch algorithm will be executed many times in parallel, so the invocations of the GenPoly protocol (element 310) for the masking polynomials can be done efficiently.

The Committee-BW protocol implements a committee performing Berlekamp-Welch in a constant number of rounds. $\mathcal{P}=\{P_i\}_{j=1}^{n}$ is used to denote the set of committees, and $\text{Com}=\{p_j\}_{j=1}^{s}$ is used to denote the committee that is to perform Berlekamp-Welch. The evaluation point of $P_i$ is $\alpha_i$, and the evaluation point of $p_j$ is $\gamma_j$. It is assumed that the polynomial f to be interpolated has already been sent to the committee. This means that each share $f(\alpha_i)$ is Shamir-shared among the committee as a polynomial $f_{\alpha_i}$ of degree no more than c such that $f_{\alpha_i}(0)=f(\alpha_i)$. Furthermore, the committee holds an additional c polynomials $r^{(1)}, \ldots, r^{(c)}$ shared with polynomial $r_{\alpha_i}^{(k)}$ of degree no more than c such that $r_{\alpha_i}^{(k)}(0)=r^{(k)}(\alpha_i)$. The protocol uses an s by $c+1$ hyper-invertible matrix M', which is publicly known and fixed throughout the MPMPC protocol.

Committee-BW (c, Com, $\{f_{\alpha_i}, \{r_{\alpha_i}^{(k)}\}_{k=1}^{c}\}_{i=1}^{n}$) protocol
1. Define polynomials $u^{(1)}, \ldots, u^{(s)}$ by $(u^{(1)}, \ldots, u^{(s)})^T = M'(f, r^{(1)}, \ldots, r^{(c)})^T$. Similarly, define $(u_{\alpha_i}^{(1)}, \ldots, u_{\alpha_i}^{(s)})^T = M'(f_{\alpha_i}, r_{\alpha_i}^{(1)}, \ldots, r_{\alpha_i}^{(c)})^T$ for each $P_i$. Each $p_j$ locally computes its share of each $u_{\alpha_i}^{(k)}$.
2. Each $p_j$ sends its share of $u_{\alpha_i}^{(k)}$ to $p_k$ for each $P_i$.
3. Each $p_j$ uses Berlekamp-Welch to interpolate $u_{\alpha_i}^{(k)}$ (and hence $u^{(k)}(\alpha_i)$) from the shares received in the previous step.
4. Each $p_j$ uses Berlekamp-Welch to interpolate $u^{(k)}$, noting which shares he believes to be incorrect.
5. Each $p_j$ sends to each member of Com the index of each committee $P_i$ which he believes to have sent an incorrect share (these are called "negative votes").
6. For each $\alpha_i$ that received more than c negative votes in the previous step, the committee Com concludes that committee $P_i$ is corrupt, and its share of f is unneeded (even if the value of $f(\alpha_i)$ sent by $P_i$ was correct). Let I be the set of all i such that $P_i$ was not deemed to be corrupt.
7. Suppose the committee wants to interpolate a set of points $\xi_1, \ldots, \xi_m$. Let $\{\lambda_i^{(k)}\}_{i \in I}$ denote the Lagrange coefficients for interpolating the point $\xi_k$ on a polynomial using the points $\{\alpha_i\}_{i \in I}$. Each $p_j$ computes its share of $f(\xi_k)$ for each $k=1, \ldots, m$ by $$f_{\xi_k}(\gamma_j) = \sum_{i \in I} \lambda_i^{(k)} f_{\alpha_i}(\gamma_j).$$

The Committee-BW protocol has communication complexity O(n) (assuming the committee wants to interpolate O(n) points, which will always be the case in the execution of the protocol). It takes two rounds of communication; once again, implementing Berlekamp-Welch in a committee the "straightforward" way would lead to O(polylog(n)) rounds of communication, so this is a significant improvement.

The invention claimed is:

1. A system for secure mobile proactive multi-party computation, the system comprising:
one or more processors and a non-transitory computer-readable medium having executable instructions encoded thereon such that when executed, the one or more processors perform operations of:
securely evaluating a circuit in the presence of an adversary, wherein the circuit receives secret inputs comprising secret values from a set of servers of a synchronous network, wherein inputs of secret values are transmitted electronically via a secure, authenticated broadcast channel;
wherein the circuit is divided into a plurality of layers, and wherein the circuit comprises input gates, random gates, addition gates, multiplication gates, and output gates;
wherein each layer of the circuit is securely evaluated as follows:
initializing a GenPoly protocol to generate sharings of random values for the random gates and the input gates;
for each input gate, opening a sharing of a random value associated with the input gate toward a server $P_i$ which is to provide input for that input gate;
broadcasting a sum of the server $P_i$'s secret value and the random value to the set of servers;
wherein each server in the set of servers uses the sum to adjust its sharing of the random value, such that its sharing of the random value is now a sharing of server $P_i$'s secret value;
initializing a Multiplication-Triple protocol to generate triples of sharings of secret values;
initializing a Secret-Redistribute protocol to re-randomize the secret values, such that privacy of the secret values is preserved;
determining a sharing of the secret values for each output gate;
initializing a Secret-Open protocol to reveal each sharing of secret values to an intended recipient; and
periodically erasing, by each server, the secret values to preserve security against an adversary.

2. The system as set forth in claim 1, wherein the number of servers n in the set of servers changes dynamically throughout the evaluation.

3. The system as set forth in claim 2, wherein the adversary may only corrupt a fixed fraction of servers in the set of servers at a given time based on a corruption threshold.

4. The system as set forth in claim 3, wherein n can increase or decrease by a factor of two regardless of the corruption threshold.

5. The system as set forth in claim 4, wherein the system provides perfect security, such that a probability of the adversary compromising the security of the evaluation of the circuit is zero.

6. The system as set forth in claim 5, wherein it is assumed that a secret s, having a corresponding secret value, has been correctly shared with a polynomial u of degree d, wherein the one or more processors further perform an operation of lowering the degree d without revealing the secret value and without requiring a set of virtual servers.

7. The system as set forth in claim 1, wherein the set of servers comprises synchronized clocks allowing communication between servers to be divided into rounds, such that in each round, secret inputs between servers are electronically transmitted at the same time.

8. A computer-implemented method for secure mobile proactive multi-party secret sharing, comprising:
an act of causing one or more processors to execute instructions stored on a non-transitory memory such that upon execution, the one or more processors perform operations of:
securely evaluating a circuit in the presence of an adversary, wherein the circuit receives secret inputs comprising secret values from a set of servers of a synchronous network, wherein inputs of secret values are transmitted electronically via a secure, authenticated broadcast channel;
wherein the circuit is divided into a plurality of layers, and wherein the circuit comprises input gates, random gates, addition gates, multiplication gates, and output gates;
wherein each layer of the circuit is securely evaluated as follows:
initializing a GenPoly protocol to generate sharings of random values for the random gates and the input gates;
for each input gate, opening a sharing of a random value associated with the input gate toward a server $P_i$ which is to provide input for that input gate;
broadcasting a sum of the server $P_i$'s secret value and the random value to the set of servers;
wherein each server in the set of servers uses the sum to adjust its sharing of the random value, such that its sharing of the random value is now a sharing of server $P_i$'s secret value;
initializing a Multiplication-Triple protocol to generate triples of sharings of secret values;
initializing a Secret-Redistribute protocol to re-randomize the secret values, such that privacy of the secret values is preserved;
determining a sharing of the secret values for each output gate;
initializing a Secret-Open protocol to reveal each sharing of secret values to an intended recipient; and
periodically erasing, by each server, the secret values to preserve security against an adversary.

9. The method as set forth in claim 8, wherein the number of servers n in the set of servers changes dynamically throughout the evaluation.

10. The method as set forth in claim 8, wherein the adversary may only corrupt a fixed fraction of servers in the set of servers at a given time based on a corruption threshold.

11. The method as set forth in claim 10, wherein n can increase or decrease by a factor of two regardless of the corruption threshold.

12. The method as set forth in claim 11, wherein the system provides perfect security, such that a probability of the adversary compromising the security of the evaluation of the circuit is zero.

13. The method as set forth in claim 12, wherein it is assumed that a secret s, having a corresponding secret value, has been correctly shared with a polynomial u of degree d, wherein the one or more processors further perform an operation of lowering the degree d without revealing the secret value and without requiring a set of virtual servers.

14. A computer program product for secure mobile proactive multi-party secret sharing, the computer program product comprising computer-readable instructions stored on a non-transitory computer-readable medium that are executable by a computer having a processor for causing the processor to perform operations of:

securely evaluating a circuit in the presence of an adversary, wherein the circuit receives secret inputs comprising secret values from a set of servers of a synchronous network, wherein inputs of secret values are transmitted electronically via a secure authenticated broadcast channel;

wherein the circuit is divided into a plurality of layers, and wherein the circuit comprises input gates, random gates, addition gates, multiplication gates, and output gates;

wherein each layer of the circuit is securely evaluated as follows:

initializing a GenPoly protocol to generate sharings of random values for the random gates and the input gates;

for each input gate, opening a sharing of a random value associated with the input gate toward a server $P_i$ which is to provide input for that input gate;

broadcasting a sum of the server $P_i$'s secret value and the random value to the set of servers;

wherein each server in the set of servers uses the sum to adjust its sharing of the random value, such that its sharing of the random value is now a sharing of server $P_i$'s secret value;

initializing a Multiplication-Triple protocol to generate triples of sharings of secret values;

initializing a Secret-Redistribute protocol to re-randomize the secret values, such that privacy of the secret values is preserved;

determining a sharing of the secret values for each output gate;

initializing a Secret-Open protocol to reveal each sharing of secret values to an intended recipient; and periodically erasing, by each server, the secret values to preserve security against an adversary.

15. The computer program product as set forth in claim 14, wherein the number of servers n in the set of servers changes dynamically throughout the evaluation.

16. The computer program product as set forth in claim 15, wherein the adversary may only corrupt a fixed fraction of servers in the set of servers at a given time based on a corruption threshold.

17. The computer program product as set forth in claim 16, wherein n can increase or decrease by a factor of two regardless of the corruption threshold.

18. The computer program product as set forth in claim 17, wherein the system provides perfect security, such that a probability of the adversary compromising the security of the evaluation of the circuit is zero.

19. The computer program product as set forth in claim 18, wherein it is assumed that a secret s, having a corresponding secret value, has been correctly shared with a polynomial u of degree d, wherein computer program product further comprises instructions for causing the processor to perform an operation of lowering the degree d without revealing the secret value and without requiring a set of virtual servers.

* * * * *